(12) United States Patent
Lillestolen et al.

(10) Patent No.: US 11,914,599 B2
(45) Date of Patent: Feb. 27, 2024

(54) MACHINE LEARNING INTERMITTENT DATA DROPOUT MITIGATION

(71) Applicant: Hamilton Sundstrand Corporation, Charlotte, NC (US)

(72) Inventors: Kirk A. Lillestolen, East Hartford, CT (US); Kanwalpreet Reen, Ellington, CT (US); Richard A. Poisson, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/455,899

(22) Filed: Nov. 19, 2021

(65) Prior Publication Data

US 2023/0161773 A1    May 25, 2023

(51) Int. Cl.
*G06F 16/2455*    (2019.01)

(52) U.S. Cl.
CPC ............... *G06F 16/24568* (2019.01)

(58) Field of Classification Search
CPC ..... G06F 16/24568; G06F 11/07; G06F 11/14
See application file for complete search history.

(56) References Cited

U.S. PATENT DOCUMENTS

| | | | |
|---|---|---|---|
| 7,480,500 B1 * | 1/2009 | Mittal | H04L 67/147 455/426.2 |
| 11,068,781 B2 | 7/2021 | Laine et al. | |
| 2005/0180443 A1 * | 8/2005 | Schulz | H04L 47/10 370/429 |
| 2020/0111005 A1 | 4/2020 | Ghosh et al. | |
| 2020/0202723 A1 | 6/2020 | Pierre et al. | |
| 2021/0125622 A1 * | 4/2021 | Zhao | G10L 19/167 |
| 2021/0142176 A1 | 5/2021 | Ratner et al. | |

(Continued)

FOREIGN PATENT DOCUMENTS

| | | | | |
|---|---|---|---|---|
| BR | 102016026255 A2 * | 7/2017 | ............. | B64D 37/00 |
| CN | 114355967 A * | 4/2022 | ........... | B64C 39/024 |

(Continued)

OTHER PUBLICATIONS

Extended European Search Report dated Feb. 16, 2023, received for European Application No. 22208032.7, pp. 15.

(Continued)

*Primary Examiner* — Etienne P Leroux
*Assistant Examiner* — J Mitchell Curran
(74) *Attorney, Agent, or Firm* — Kinney & Lange, P.A.

(57) ABSTRACT

Apparatus and associated methods relate to mitigating data-stream dropout in a serial data-stream. A time-sequence of messages of the serial data-stream is received, each containing a data packet communicating an action. Validity of each of the time-sequence of messages received is determined. After receiving each valid message, a plurality of future actions is created based at least in part on the valid message received. The plurality of future actions corresponds to a plurality of future data packets of the time-sequence of messages. After receiving each valid message, the action communicated in the valid message received is performed. After receiving each invalid messages, a next one of the set of sequential future actions created is instead used in place of any action communicated in the data packet of the invalid message received.

19 Claims, 3 Drawing Sheets

(56) References Cited

U.S. PATENT DOCUMENTS

| | | |
|---|---|---|
| 2021/0241096 A1 | 8/2021 | Baskin et al. |
| 2021/0286068 A1 | 9/2021 | Kumar et al. |
| 2021/0295171 A1 | 9/2021 | Kamenev et al. |
| 2022/0021612 A1* | 1/2022 | Zhou .................. H04L 43/0829 |

FOREIGN PATENT DOCUMENTS

| | | | | |
|---|---|---|---|---|
| EP | 2736205 A1 * | 5/2014 | ........... | H04L 47/286 |
| WO | WO-2020002622 A1 * | 1/2020 | ............. | G06Q 50/04 |

OTHER PUBLICATIONS

James Haworth & Tao Cheng, Non-parametric regression for space-time forecasting under missing data, Computers, Environment and Urban Systems Journal, Sep. 30, 2012, pp. 539-550, Civil, Environmental and Geomatic Engineering, University College London, United Kingdom.

Shin-Fu Wu, Chia-Yung Chang, & Shie-Jue Lee, Time Series Forecasting with Missing Values, 2015 1st International Conference on Industrial Networks and Intelligent Systems (INISCom), 2015, pp. 15-156, Department of Electrical Engineering, National Sun Yat-Sen University, Taiwan.

* cited by examiner

MACHINE LEARNING INTERMITTENT DATA DROPOUT MITIGATION

BACKGROUND

Various types of communications channels are used for communications between two or more communicating entities. Some communications channels use physical transmission media, such as electrical wires connecting communicating transceivers. Other communications can be performed using electromagnetic waves, such as radio waves, microwaves, millimeter waves, optical signals, etc. Regardless of the type of communications channel used, communicating over such communications channels can be interrupted for various reasons, such as noise from the transceivers and interference from other sources. Such interruptions can cause data transmitted over the communications channel to be not detected by the intended receiver or to be erroneously detected (e.g., the received data might be detected in a different manner than such data was transmitted). 'Data dropout' is a term describing such undetected and erroneously detected data.

Serial communications are those communications in which data is serial transmitted. Some serial communications transmit data as a time-sequence of messages, each containing a packet of data. For example, the packet of data can be a byte of data, a word of data or a string of data.

SUMMARY

Apparatus and associated methods relate to a system for mitigating data-stream dropout in a serial data-stream. The system includes an input interface, a plurality of machine learning modules, and an action register. The input interface receives, as input, a time-sequence of messages of the serial data-stream. Each of the time-sequence of messages contains a data packet communicating an action. The input interface further determines validity of each of the time-sequence of messages received, thereby determining valid messages and invalid messages of the time-sequence of messages received. The plurality of machine learning modules creates, after each valid message received by the input interface, a set of sequential future actions based at least in part on the valid message received. The action register performs, after each valid message received by the input interface, the action communicated by the data packet contained in the valid message received. The action register instead performs, after each invalid message received by the input interface, a next one of the set of sequential future actions created.

Some embodiments relate to a method for mitigating data-stream dropout in a serial data-stream. The method includes receiving, as input, a time-sequence of messages of the serial data-stream, each of the time-sequence of messages containing a data packet communicating an action. The method includes determining validity of each of the time-sequence of messages received, thereby determining valid messages and invalid messages of the time-sequence of messages received. The method includes creating, after receiving each valid message, a plurality of sequential future actions based at least in part on the valid message received. The method includes performing, after receiving each valid message, the action communicated by the data packet contained in the valid message received. The method also includes performing, after receiving each invalid message, a next one of the plurality of sequential future actions created.

DETAILED DESCRIPTION

Apparatus and associated methods relate to mitigating data-stream dropout in a serial data-stream. A time-sequence of messages of the serial data-stream is received, each containing a data packet communicating an action. Validity of each of the time-sequence of messages received is determined. After receiving each valid message, a plurality of future actions is created based at least in part on the valid message received. The plurality of future actions corresponds to a plurality of future data packets of the time-sequence of messages. After receiving each valid message, the action communicated in the valid message received is performed. After receiving each invalid messages, a next one of the set of sequential future actions created is instead used in place of any action communicated in the data packet of the invalid message received.

Figure 1:
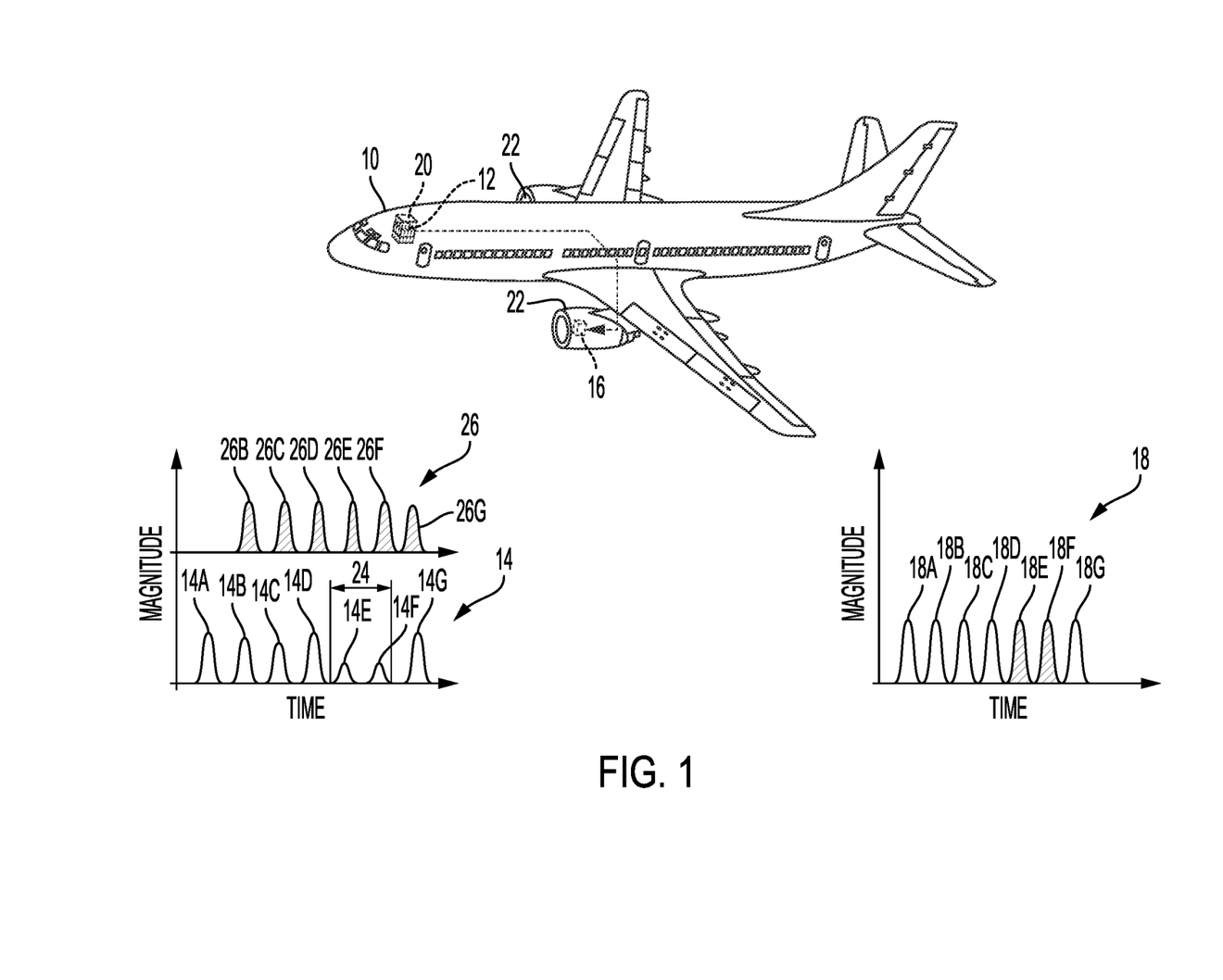
FIG. 1 is a schematic view of an airplane equipped with a system for creating future actions to be communicated by data lost during a data-stream dropout in a serial data-stream(s).

FIG. 1 is a schematic view of an airplane equipped with a system for creating future actions to be communicated by data lost during a data-stream dropout in a serial data-stream(s). In FIG. 1, aircraft 10 has various data-processing modules for performing various functions. One such data-processing module 20, perhaps located in an electronics bay, is equipped with data-dropout-mitigation system 12, which mitigates data dropout of one or more data sources which are provided to electronic module 20. Data-dropout-mitigation system 12 mitigates data-dropout using machine learning engines trained to predict, based on past valid data received, future actions to be communicated by future data to be transmitted by the one or more data sources. Data-dropout-mitigation system 12 can receive data from the one or more sources, and then create or generate future actions based on the data received from those one or more sources. Data-processing module 20 determines if the data received is valid or invalid, and based on such validity determinations, performs actions pertaining to data-processing module 20. Such actions performed are either those communicated by the valid data received or the future actions created.

In the FIG. 1 depiction, data-dropout-mitigation system 12 receives, as input, serial data-stream 14 from sensor 16 and performs, as output, actions 18 pertaining to data-processing module 20 of aircraft 10. Sensor 16 senses a physical parameter associated with engine 22 of aircraft 10. Serial data-stream 14 is a time-sequence of messages 14A-14G (depicted schematically in envelope fashion), each of which contains a data packet indicative of the physical parameter sensed. In other embodiments, data packets can contain data pertinent to the device or component that transmits serial data-stream 14. For example, sensors may transmit data indicative of a sensed parameter, a control module may transmit data to command or perform various operations, communications modules may contain data indicative of a communication, etc. Engine 22 has various other components that generate electromagnetic fields, which can interfere with communications between sensor 12 and data-processing module 20. In the FIG. 1 depiction, such interferences compromise serial data-stream 12 during interference time-period 24, during which messages 14E and 14F are transmitted.

For some serial data-streams, suffering intermittent data dropout can have deleterious consequences. For example, loss of sensor information potentially can result in reduction of control of aircraft 10, or loss of communication between a pilot and a ground control center can compromise coordination of a flight path of aircraft 10 (e.g., if redundant systems are also compromised). Such serial data-streams often have a nature in which the data contained in the time-sequence of messages 14A-14D are indicative of the information contained in messages 14E and 14F. As such, messages 14A-14D are predictive of messages 14E and 14F, and so a machine can be built so as to predict future data packets, based the messages of data-stream 14 that precede those future data packets. Such prediction is one function of data-dropout-mitigation system 12, which is interposed between sensor 16 and electronic module 20. In FIG. 1, data-dropout mitigation system 12 is a module of a component of electronic module 20. Such a component module provides output locally to the component to which data-dropout mitigation system 12 belongs. In another embodiment, data-dropout mitigation system 12 can provide outputs that are distributed to more than one receiving component.

Data-dropout-mitigation system 12 receives message 14A of serial data-stream 14. After message 14A is received, data-dropout-mitigation system 12 determines validity of the received message 14A. If received message 14A is determined to be valid, then data-dropout-mitigation system 12 creates a set of sequential future data packets 26B-26F (depicted schematically in envelope fashion). Sequential future data packets 26B-26F are created, at least in part, on received valid message 14A (e.g., based on the data packets of such valid messages received). Because received message 14A was determined to be valid, data-dropout-mitigation system 12 uses the data packet contained within received message 14A to data-processing module 20 as action 18A of data packet stream 18.

Data-dropout-mitigation system 12 then receives messages 14B of serial data-stream 14. After message 14B is received, data-dropout-mitigation system 12 determines validity of the received message 14B. If received message 14B is determined to be valid, then data-dropout-mitigation system 12 creates a set of sequential future data packets 26C-26G. Sequential future data packets 26B-26F are created, at least in part, on received valid message 14B (e.g., based on the data packets of such valid messages received). In creating sequential future data packets 26C-26G, sequential future data packets 26C-26F, which were previously created based, at least in part, on message 14A, have been updated using information provided by message 14B. Because received message 14B was determined to be valid, data-dropout-mitigation system 12 transmits the data packet contained within received message 14B to data-processing module 20 as data packet 18B of data packet stream 18.

In similar fashion, data-dropout-mitigation system 12 then receives messages 14C and 14D of serial data-stream 14. After each of messages 14C and 14D is received, data-dropout-mitigation system 12 determines validity of the received message 14C and 14D, respectively. If received messages 14C and 14D are determined to be valid, then data-dropout-mitigation system 12 creates a set of sequential future data packets 26D-26H and 26E-26I, respectively. Sequential future data packets 26D-26H and 26E-26I are created, at least in part, on received valid messages 14C and 14D, respectively. In creating sequential future data packets 26D-26H and 26E-26I, sequential future data packets 26C-26F or 26D-26G, which were previously created based, at least in part, on message 14B and 14C, have been updated using information provided by message 14C and 14D, respectively. Because received messages 14C and 14D were determined to be valid, data-dropout-mitigation system 12 transmits received message 14C and 14D to data-processing module 20 as data packets 18C and 18D of data packet stream 18, respectively.

Unlike messages 14A-14D, message 14E is transmitted during interference time-period 24. Data-dropout-mitigation system 12 receives messages 14E of serial data-stream 14, but the interfering signal compromises a signal-to-noise ratio of message 14E, as received by data-dropout-mitigation system 12. After message 14E is received, data-dropout-mitigation system 12 determines that received message 14E is not valid (e.g., the message has been corrupted). Because received message 14E has been determined to be invalid, instead of transmitting received message 14E, data-dropout-mitigation system 12 transmits future data packet 26E to data-processing module 20 as data packet 18E of data packet stream 18. Furthermore, because received message 14E has been determined to be invalid, data-dropout-mitigation system 12 does not update any of the sequential future data packets 26F-26I.

Message 14F is also transmitted during interference time-period 24 and, when received, is determined to be invalid by data-dropout-mitigation system 12. Therefore, data-dropout-mitigation system 12 transmits future data packet 26F to data-processing module 20 as data packet 18F of data packet stream 18 instead of transmitting received message 14F. Again, because received message 14F has been determined to be invalid, data-dropout-mitigation system 12 does not update any of the sequential future data packets 26G-26I.

Lastly, message 14G is received by data-dropout-mitigation system 12. Message 14G is transmitted outside of the interference time-period 24, and so message 14G, as received by data-dropout-mitigation system 12, is not compromised. After message 14G is received, data-dropout-mitigation system 12 determines validity of the received message 14G. If received message 14G is determined to be valid, then data-dropout-mitigation system 12 creates a set of sequential future data packets 26H-26M. Sequential future data packets 26H-26M are created, at least in part, on received valid message 14E. In some embodiments, sequential future data packets 26H-26M can be created, at least in part, based on the future data packets 26E and 26F, which were used in substitution for invalid messages 14E and 14F. In creating sequential future data packets 26H-26M, sequential future data packets 26H-26I, which were previously created based, at least in part, on message 14D, have been updated using information provided by message 14G. Because received message 14G was determined to be valid, data-dropout-mitigation system 12 transmits received message 14G to data-processing module 20 as data packet 18G of data packet stream 18.

Various embodiments of data-dropout-mitigation system 12 creates and/or updates various numbers N of future data packets after each valid message is received. Thus, a data dropout that lasts less than or equal to the time duration for serial transmission of N messages can be weathered without transmitting any of the N invalid messages received during such a data dropout. Furthermore, the future data packets substituted for the invalid messages can be determined with a reasonably high quality, and thus compromise of the serial communication can be minimized by such creation and substation of messages. This minimization of compromise can be valuable, as the lost messages can have various negative consequences, such as, in this depicted example, reduced control of aircraft 10. In some embodiments, instead of simply transmitting data packets to a receiving entity, data-dropout-mitigation system 12 may perform operations that are indicated by such data packets.

Although the FIG. 1 embodiment shows data-dropout-mitigation system 12 receiving data from a single source—sensor 16, in other embodiments, data-dropout mitigation systems can receive data from multiple sources. In such embodiments, data-dropout-mitigation system 12 can be configured to create future data for one of, some of, or all such sources from which data is received. In some embodiments, the use of data from multiple sources can facilitate better quality creation of future data.

Although the FIG. 1 embodiment shows data-dropout-mitigation system 12 providing either the data received or the future data created onto a single data-processing module—data-processing module 20, in other embodiments, data-dropout-mitigation system 12 can be configured to provide data to multiple data-processing modules. For example, if sensor 16 provides data to multiple data-processing modules, then data-dropout-mitigation system 12 can be used to provide either the data received from sensor 16 or the future data created by data-dropout-mitigation system 12 to those multiple data processing modules.

In still other embodiments, data-dropout-mitigation systems can be customized for operation with a specific data-processing module. In such customized configurations, instead of simply providing either the data received or the future data created onto data-processing module 20, data-dropout-mitigation system 12 can use either the data received or the future data created to perform actions, functions, or operations corresponding to data-processing module 20. In such embodiments, data-dropout-mitigation system 12 need not create future data in the same format as the data received, but can simply perform such actions, functions, or operations and/or create data corresponding to future actions, functions, or operations corresponding to data-processing module 20. Such future actions, functions, or operations corresponding to those that data-dropout-mitigation system 12 expects (i.e., creates, predicts, etc.) would be communicated in the data that is lost during a data-dropout event. Such future actions, functions, or operations would be performed at the time(s) that data-dropout-mitigation system 12 expected (i.e., created, predicted, etc.) based on the data received before such a data-dropout event occurs.

Furthermore, although the FIG. 1 embodiment shows data-dropout-mitigation system 12 receiving serial data in the form of a time sequence of messages 14A-14F, mitigation of data dropout can be performed for other types and formats of data. For example, data can be received in analog form, in digital form, as a continuous stream of data, as a time-sequence of data packets, etc. Data received can have various formats—proprietary and/or in accord with various industry standards and protocols. Data can be received by data-dropout-mitigation system 12 via electrical conductors, optical fibers, radio transmissions, etc.

Figure 2:
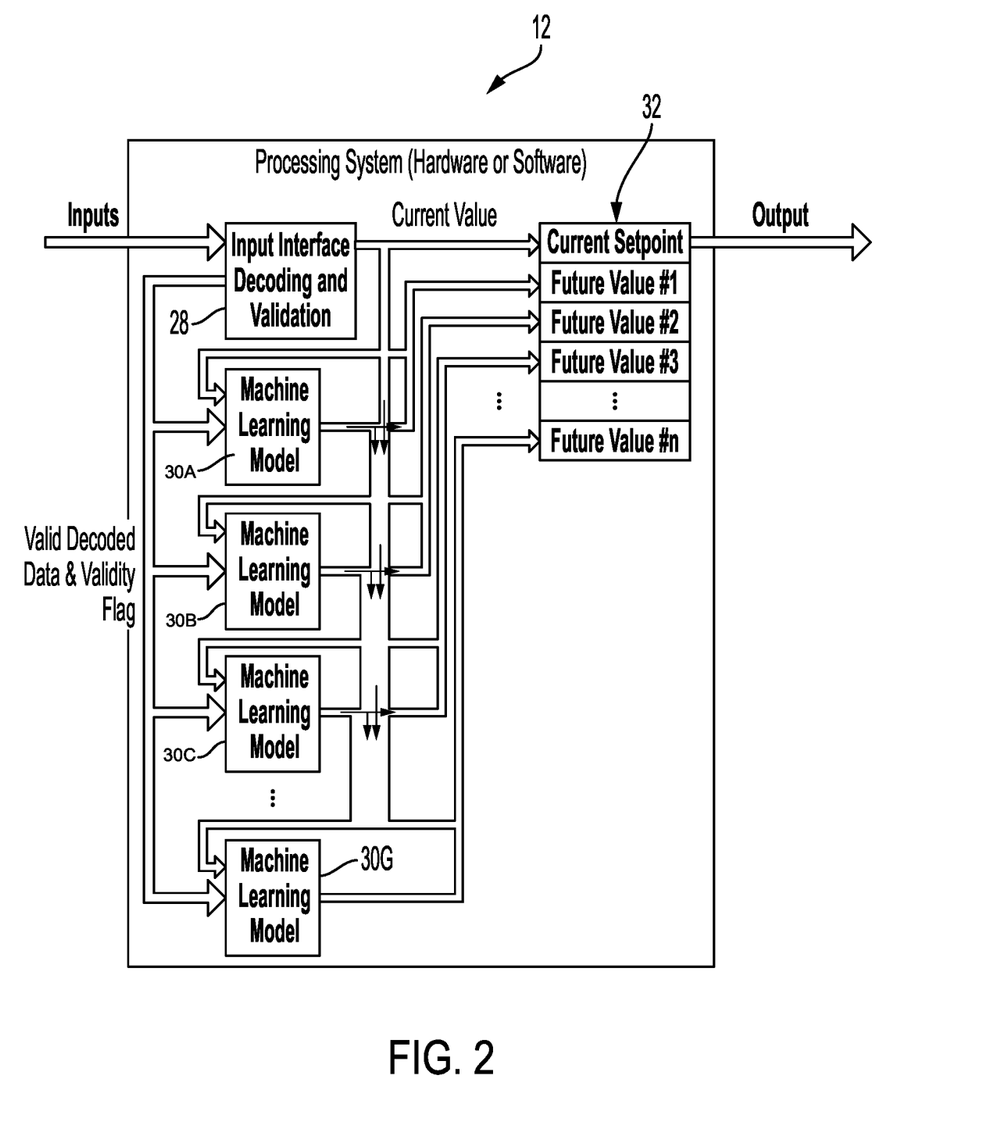
FIG. 2 is a schematic diagram of a data-dropout-mitigation system.

FIG. 2 is a schematic diagram of a data-dropout mitigation system. In FIG. 2, data-dropout-mitigation system 12 includes input interface 28, machine learning modules 30A-30G, and action register 32. Input interface 28 is connected to a transmitter of serial data-stream 14 so as to receives the time-sequence of messages 14A-14G transmitted thereby. Input interface 28 decodes and validates each of the time-sequence of messages 14A-14G received. Decoding and validating are performed according to the encoding and validation methods used for transmission. Such decoding and validation methods can be specific to the communications protocol used for transmission. Such methods can vary from one protocol to another (e.g., they can have variations in timing checks, parity checks, cyclic redundancy checks, etc.) For example, input interface 28 can be configured to decode and validate messages received, which have been transmitted in accordance with protocols of communications such as ARINC 429, CANBUS, ARINC 664. Such encoding and decoding and validation methods are known to persons of ordinary skill in the art.

Each of machine learning engines 30A-30G have been trained to predict and generate a future action and/or data packet. Machine learning engine 30A has been trained to predict and generate a future action corresponding to the next message expected to be received and/or to create the future data packet that immediately follows the most recent message received and validated by input interface 28. Machine learning engine 30B has been trained to predict and generate a future action and/or data packet corresponding to the second message expected to follow the most recent message received and validated by input interface 28. In this same fashion, each of machine learning engines 30C-30G have been trained to predict and generate a corresponding future action and/or a corresponding one of the subsequent messages that will be the third through seventh following the most recent message received and validated by input interface 28.

The training required for such prediction and generation is performed before data-dropout-mitigation system 12 is deployed. Persons who are skilled in the art of machine learning are knowledgeable of various methods of training operations associated with machine learning engines 30A-30G. In an exemplary embodiment, each of machine learning engines 30A-30G are different from one another, each having an associated training operation specific to that machine learning engine. A training operation can utilize one or more different possible training modes. Parameter coefficients used in machine learning engines 30A-30G can be determined during such training operations (i.e., learning phase). In another exemplary embodiment, two or more of the machine learning engines 30A-30G can employ the same machine-learning algorithm, with each having a different machine-learning training set to create unique machine learning engines 30A-30G. Such training algorithms are disclosed in: i) U.S. patent application Ser. No. 16/715,948, entitled "Real Time Output Control Based on Machine Learning Hardware Implementation," by Kirk A. Lillestolen, et al., filed Dec. 16, 2019 and published as US20210181694A1 on Jun. 17, 2021, and ii) U.S. patent application Ser. No. 16/715,964, entitled "Real Time Output Control in Hardware Based on Machine Learning," by Kirk A. Lillestolen, et al., filed Dec. 16, 2019 and published as US20210182737A1 on Jun. 17, 2021. Each of the above cited patent applications are hereby incorporated by reference in its entirety.

Although FIGS. 1 and 2 depict an embodiment in which a time-sequence of discrete messages are transmitted, other embodiments of data-dropout-mitigation systems can be implemented for other types of data-streams. For example, machine learning methods can be used to predict future data of a continuous stream of serial data (e.g., one that is not divided into discrete messages). Each of machine learning engines 30A-30G can be trained to determine and generate a single bit or a predetermined number of bits of the serial data-stream, for example. Although FIGS. 1 and 2 depict an embodiment that uses seven machine learning engines, other numbers of machine learning engines can be used. For example, a data-dropout-mitigation system can have ten (or more) machine learning engines, which would facilitate determination and generation of ten (or more) future actions and/or data packets. Some embodiments can be configured to determine and generate future data that is dependent on more than a single data-stream. Such embodiments receive, as inputs, all data-streams on which such future data is dependent.

Action register 32 receives the future action and/or data packets generated by machine learning engines 30A-30G and stores them for later retrieval. Message register also receives the latest message validated by input interface 28. Message register outputs or transmits the message received from input interface if input interface validates that message. If instead, input interface does not validate the latest message received, message register will instead output or transmit future actions and/or data packet #1 generated by machine learning module 30A. If input interface continues to receive messages that cannot be validated, message register will continue to sequence through future actions and/or data packets 32B-32G as outputs, transmitting them to a receiving system connected to an output port of action register 32. Such substitution of future actions and/or data packets generated by machine learning modules 30A-30G continues until all such messages have been transmitted, or until input interface validates a message received, whichever comes. In some embodiments, action register 32 can be a shift register, which is configured to shift the future actions and/or data packets out in serial fashion and transmit one shifted future actions and/or data packet in response to each invalid message received.

Figure 3:
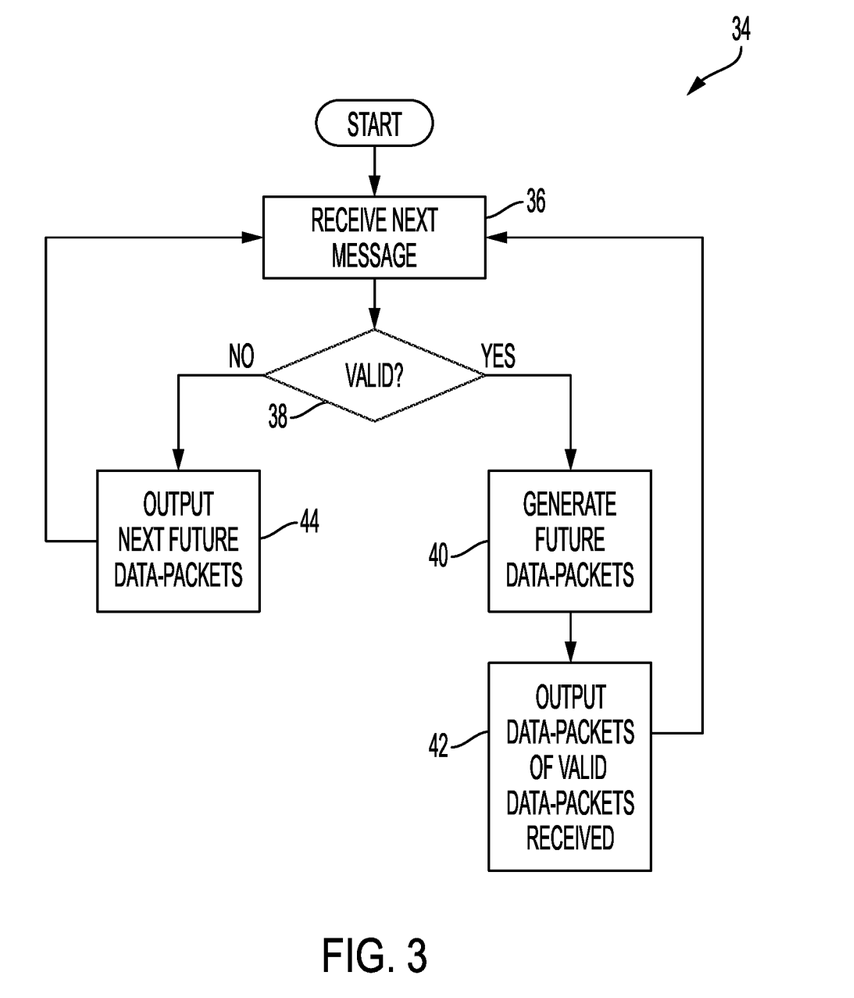
FIG. 3 is a method for recreating and substituting sequential messages of a serial data-stream during a data-stream dropout.

FIG. 3 is a method for recreating and substituting sequential messages of a serial data-stream during a data-stream dropout. In FIG. 3, method 34 can be performed by a system having input interface 28, machine learning modules 30A-30G (or any other number of machine learning modules), and action register 32. Method 34 begins at step 36 where input interface 28 receives, as input, a next message in a time-sequence of messages from a serial data-stream that can suffer intermittent data-stream dropouts. Then, at step 38, input interface 28 determines validity of a next message of the time-sequence of messages received. If input interface has determined that a valid message has been received, method 34 proceeds to step 40, where machine learning modules 30A-30G create a set of sequential future actions and/or data packets based, at least in part, on the valid messages received. At step 42, the valid messages of the time-sequence of messages received are transmitted by action register 32. If, however, at step 38 input interface 28 determines that an invalid message has been received, method 34 proceeds to step 44, where a next of the future actions and/or data packets determined is transmitted by action register 32. Method 34 then returns from both steps 42 and 44 to step 36 where input interface 28 receives, as input, the next message in a time-sequence of messages from a serial data-stream.

Various methods of transmissions can be used to transmit and/or receive the serial data-stream. For example, serial data-streams can be transmitted over various media, such as over electrically conductive wires, wirelessly, through water, optically, etc. Furthermore, these serial communications can be performed according to various communications protocols, both standard and custom. These various communications methods lead to various means for receiving a time-sequence of messages of the serial data-stream can be used in various embodiments. For example, means for receiving a time-sequence of messages can include an electronic communications interface component, an optical communications receiver, an electromagnetic wave receiver (e.g., an antenna), a sonar receiver, etc. Such embodiments can further include communications interface components, modules, and circuits. Such communications interface components can be stand-alone components of modules of a larger component, such as for example a communications processor or a general-purpose processor.

Various methods of determining validity of each of the time-sequence of messages received can include cyclic redundancy checks, parity checks, signature comparisons, blockchain encoding, etc. Various means for determining validity of each of the time-sequence of messages received can be used to perform these various methods of determining validity. For example, such means for determining validity can again include communications interface components, modules, and circuits. Such communications interface components can be stand-alone components of modules of a larger component, such as for example a communications processor or a general-purpose processor.

Various methods can be used to create a plurality of sequential future actions. For example, trained machine-learning engines can use such training to predict and create future actions corresponding to a plurality of data expected to immediately follow the last valid data received over a communications channel. Various means for creating the plurality of sequential future actions can be used to perform these various methods of creating the plurality of sequential future actions. For example, means for creating the plurality of sequential future actions can one or more machine learning engines, a custom processor programmed for machine learning, a general-purpose processor programmed for machine learning, etc.

Various means for choosing either the action communicated by the data packet contained in the valid message received or a next one of the plurality of sequential future actions created can include any decision modules, such as a comparator, a flip-flop, a multiplexor, a custom processor, a general-purpose processor, etc. Various means of performing the chosen action (i.e., either the action communicated by the data packet contained in the valid message received or a next one of the plurality of sequential future actions created) can include a shift register, a FIFO (i.e., First In First Out) register, a multiplexor, a custom processor, a general-purpose processor, etc.

Discussion of Possible Embodiments

The following are non-exclusive descriptions of possible embodiments of the present invention.

Apparatus and associated methods relate to a system for mitigating data-stream dropout in a serial data-stream. The system includes an input interface, a plurality of machine learning modules, and an action register. The input interface receives, as input, a time-sequence of messages of the serial data-stream. Each of the time-sequence of messages contains a data packet communicating an action. The input interface further determines validity of each of the time-sequence of messages received, thereby determining valid messages and invalid messages of the time-sequence of messages received. The plurality of machine learning modules creates, after each valid message received by the input interface, a set of sequential future actions based at least in part on the valid message received. The action register performs, after each valid message received by the input interface, the action communicated by the data packet contained in the valid message received. The action register instead performs, after each invalid message received by the input interface, a next one of the set of sequential future actions created.

The system of the preceding paragraph can optionally include, additionally and/or alternatively, any one or more of the following features, configurations and/or additional components:

A further embodiment of the foregoing systems, wherein the action register performs the action communicated by the data packet of the valid message received, at least in part, by transmitting the valid message received.

A further embodiment of any of the foregoing systems, wherein the set of sequential future actions created can correspond to a set of future messages expected to immediately follow the valid message received in the serial data-stream.

A further embodiment of any of the foregoing system, wherein the plurality of machine learning engines can predict the set of sequential future actions to be communicated by data packets contained in the set of future messages expected to immediately follow the valid message received in the serial data-stream.

A further embodiment of any of the foregoing systems, wherein the set of sequential actions created by the plurality of machine learning engines can include a set of future substitute messages corresponding to the set of future messages expected to immediately follow the valid message received in the serial data-stream.

A further embodiment of any of the foregoing systems, wherein the action register can perform a next one of the set of sequential future actions created, at least in part, by transmitting a next one of the set of plurality of substitute messages.

A further embodiment of any of the foregoing systems, wherein the action register can transmit a signal indicative of a fault condition in response to receiving an invalid message after performing a last one of the set of sequential future actions created.

A further embodiment of any of the foregoing systems, wherein the plurality of machine learning engines can have a training mode in which the machine learning engines are trained and an operating mode in which the machine learning engines create the set of sequential future actions based at least in part on the valid message received.

A further embodiment of any of the foregoing systems, wherein plurality of future data packets is further based on training of the plurality of machine learning engines.

Some embodiments relate to a method for mitigating data-stream dropout in a serial data-stream. The method includes receiving, as input, a time-sequence of messages of the serial data-stream, each of the time-sequence of messages containing a data packet communicating an action. The method includes determining validity of each of the time-sequence of messages received, thereby determining valid messages and invalid messages of the time-sequence of messages received. The method includes creating, after receiving each valid message, a plurality of sequential future actions based at least in part on the valid message received. The method includes performing, after receiving each valid message, the action communicated by the data packet contained in the valid message received. The method also includes performing, after receiving each invalid message, a next one of the plurality of sequential future actions created.

The method of the preceding paragraph can optionally include, additionally and/or alternatively, any one or more of the following features, configurations and/or additional components:

A further embodiment of the foregoing method, wherein performing the action communicated by the data packet contained in the valid message received can include transmitting the valid message received.

A further embodiment of any of the foregoing methods, wherein performing the action communicated by the data packet contained in the valid message received can include processing data indicated by the data packet contained in the valid message received.

A further embodiment of any of the foregoing methods, wherein the set of sequential future actions created can correspond to a plurality of future messages expected to immediately follow the valid message received in the serial data-stream.

A further embodiment of any of the foregoing methods, wherein performing the next one of the plurality of sequential future actions created can include processing data predicted to be indicated by the data packet contained in a next one of the plurality of future messages expected to immediately follow the valid message received in the serial data-stream.

A further embodiment of any of the foregoing methods, wherein creating the plurality of sequential future actions can include predicting the plurality of sequential future actions to be communicated by data packets contained in the plurality of future messages expected to immediately follow the valid message received in the serial data-stream.

A further embodiment of any of the foregoing methods, wherein creating the plurality of sequential future actions can include creating a plurality of future substitute messages corresponding to the plurality of future messages expected to immediately follow the valid message received in the serial data-stream.

A further embodiment of any of the foregoing methods, wherein performing a next one of the set of sequential future actions created can include transmitting a next one of the set of substitute messages.

A further embodiment of any of the foregoing methods can further include training the plurality of machine learning engines.

A further embodiment of any of the foregoing methods, wherein creating the plurality of sequential future actions can be further based on the training of the plurality of machine learning engines.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for mitigating data-stream dropout in a serial data-stream, the method comprising:

receiving, as input, a time-sequence of messages of the serial data-stream, each of the time-sequence of messages containing a data packet communicating an operation to control an aircraft;

determining validity of each of the time-sequence of messages received, thereby determining valid messages and invalid messages of the time-sequence of messages received;

predicting, after receiving each valid message, a plurality of sequential future operations to control the aircraft, the plurality of sequential future operations to control the aircraft predicted based at least in part on the valid message received, wherein the plurality of sequential future actions predicted corresponds to a plurality of future messages expected to immediately follow the valid message received in the serial data-stream;

performing, after receiving each valid message, the operation to control the aircraft communicated by the data packet contained in the valid message received;

storing, after receiving each valid message, the plurality of sequential future operations to control the aircraft; and performing, after receiving each invalid message, a next one of the plurality of sequential future operations to control the aircraft stored after a last valid message was received.

2. The method of claim 1, wherein performing the operation to control the aircraft communicated by the data packet contained in the valid message received includes:
transmitting the valid message received.

3. The method of claim 1, wherein performing the operation to control the aircraft communicated by the data packet contained in the valid message received includes:
processing data indicated by the data packet contained in the valid message received.

4. The method of claim 1, wherein performing the next one of the plurality of sequential future operations to control the aircraft includes:
processing data predicted to be indicated by the data packet contained in a next one of the plurality of future messages expected to immediately follow the valid message received in the serial data-stream.

5. The method of claim 4, wherein predicting the plurality of sequential future operations to control the aircraft includes:
predicting the plurality of sequential future operations to control the aircraft to be communicated by data packets contained in the plurality of future messages expected to immediately follow the valid message received in the serial data-stream.

6. The method of claim 4, wherein predicting the plurality of sequential future operations to control the aircraft includes:
predicting a plurality of substitute future messages corresponding to the plurality of sequential future messages expected to immediately follow the valid message received in the serial data-stream.

7. The method of claim 6, wherein performing a next one of the plurality of sequential future operations to control the aircraft includes:
transmitting a next one of the plurality of substitute future messages.

8. The method of claim 1, further comprising:
transmitting a signal indicative of a fault condition in response to receiving an invalid message after performing a last one of the plurality of sequential future operations to control the aircraft.

9. The method of claim 1, further comprising:
training the plurality of machine learning engines.

10. The method of claim 9, wherein predicting the plurality of sequential future operations to control the aircraft is further based on the training of the plurality of machine learning engines.

11. A system for mitigating data-stream dropout in a serial data-stream, the system comprising:
an input interface that receives, as input, a time-sequence of messages of the serial data-stream, each of the time-sequence of messages containing a data packet communicating an operation to control an aircraft, the input interface further determining validity of each of the time-sequence of messages received, thereby determining valid messages and invalid messages of the time-sequence of messages received;

a plurality of machine learning modules that predicts, after each valid message received by the input interface, a corresponding plurality of sequential future operations to control the aircraft based at least in part on the valid message received, wherein the plurality of sequential future operations to control the aircraft corresponds to a plurality of future messages expected to immediately follow the valid message received in the serial data-stream; and an action register that stores, after receiving each valid message, the plurality of sequential future operations to control the aircraft;

a control module that performs, after each valid message received by the input interface, the operation to control an aircraft communicated by the data packet contained in the valid message received the control module instead performs, after each invalid message received by the input interface, a next one of the set of sequential future operations to control an aircraft stored by the action registered after a last valid message was received.

12. The system of claim 11, wherein the action register performs the action communicated by the data packet of the valid message received, at least in part, by transmitting the valid message received.

13. The system of claim 11, wherein the set of sequential future operations to control the aircraft corresponds to a set of future messages expected to immediately follow the valid message received in the serial data-stream.

14. The system of claim 13, wherein the plurality of machine learning engines predict the set of sequential future operations to control the aircraft to be communicated by data packets contained in the set of future messages expected to immediately follow the valid message received in the serial data-stream.

15. The system of claim 13, wherein the set of sequential operations to control the aircraft by the plurality of machine learning engines include a set of substitute future messages corresponding to the set of future messages expected to immediately follow the valid message received in the serial data-stream.

16. The system of claim 15, wherein the action register performs a next one of the set of sequential future operations to control the aircraft, at least in part, by transmitting a next one of the set of substitute future messages.

17. The system of claim 11, wherein the action register transmits a signal indicative of a fault condition in response to receiving an invalid message after performing a last one of the set of sequential future operations to control the aircraft.

18. The system of claim 11, wherein the plurality of machine learning engines has a training mode in which the plurality of machine learning engines is trained and an operating mode in which the plurality of machine learning engines predicts the set of sequential future operations to control the aircraft based at least in part on the valid message received.

19. A system for mitigating data-stream dropout in a serial data-stream, the method comprising:
- means for receiving, as input, a time-sequence of messages of the serial data-stream, each of the time-sequence of messages containing a data packet communicating an operation to control an aircraft;
- means for determining validity of each of the time-sequence of messages received, thereby determining valid messages and invalid messages of the time-sequence of messages received;
- means for predicting, after receiving each valid message, a plurality of sequential future actions based at least in part on the valid message received, wherein the plurality of sequential future operations to control the aircraft corresponds to a plurality of future messages expected to immediately follow the valid message received in the serial data-stream;
- means for performing, after receiving each valid message, the action communicated by the data packet contained in the valid message received;
- means for storing, after receiving each valid message, the plurality of sequential future operations to control the aircraft and
- means for performing, after receiving each invalid message, a next one of the plurality of sequential future actions stored after a last valid message was received.

* * * * *